UNITED STATES PATENT OFFICE.

WALTER LOIS LODGE, OF SEATTLE, WASHINGTON, ASSIGNOR OF ONE-HALF TO AUGUSTUS WILLIAM LOHMANN, OF KING COUNTY, WASHINGTON.

PROCESS OF PRESERVING FRUIT.

1,009,325. Specification of Letters Patent. Patented Nov. 21, 1911.

No Drawing. Application filed December 10, 1910. Serial No. 596,632.

*To all whom it may concern:*

Be it known that I, WALTER LOIS LODGE, a citizen of the United States, and a resident of Seattle, in the county of King and State of Washington, have invented a certain new and useful Process of Preserving Fruit, of which the following is a full, true, and exact specification, which will enable others skilled in the art to use the same.

The principal object of this invention is to produce a cooked fruit which may be exposed to the air for a great length of time, and, which, when simply treated with water is ready for the table, having retained substantially all its original agreeable qualities such as flavor, color, etc.

An important feature of the invention is that fruit treated by this process is preserved in a better condition for a much longer time than is possible by the ordinary processes of drying or evaporating, as the fruit will not mold or mildew even if kept in a rather damp atmosphere, as is the case with fruit dried or evaporated by processes now known in the art.

The process, as hereinafter fully described, applies to fruits in general, my experiments, however, having been chiefly confined to the process as applied to apples. It will, of course, be understood that different varieties of apples contain varying amounts of natural sugar and acid, and also that different specimens of the same variety may, and often do vary in this respect when grown in different climates, or for other causes. It is obvious, therefore, that it is not possible to apply the process without some slight change to accommodate the same to these varying conditions, not, however, to any such degree as to compel those skilled in the art to resort to experiment of any extent in order to successfully use the process as will now be fully described.

In the treatment of apples the fruit is first peeled cored and sliced and immediately immersed into a boiling solution of water, sugar and citric acid, or its equivalent. Care must be taken that the fruit be not allowed to remain exposed to the air after having been peeled, this being an important step in the process, as such exposure impairs the natural flavor of the fruit and also eventually changes its color even if not noticeable at the time. The fruit is allowed to remain in the boiling solution for fifteen to twenty minutes, after which it is allowed to gradually cool until it becomes approximately transparent. The fruit is then removed from the liquid and the moisture allowed to evaporate therefrom. To about ten pounds of apples of about the acidity and general characteristics of the black winesap, for example, the boiling solution should be composed of approximately one quart of water in which one and three quarter pounds of sugar has been dissolved, to which is added a half teaspoonful of citric acid solution which is in the proportion of about one apothecary's ounce of the acid to one gill of water.

I am fully aware that it is not new in the art to slice, peel and core the fruit and afterward treat the same with water and sugar or the like, but such treatment alone does not attain the same desirable end as that attained by my improved process, particularly in that the original flavor of the fruit is invariably impaired as well as the color and general appearance thereof. In other words, sauces or other condiments prepared from the evaporated or dried fruit, as now known in the art, so far as I am aware, are at once distinguishable from similar preparations in which the fresh fruit has been used. Furthermore, fruits dried, or evaporated by processes now known to the art will sooner or later mildew or mold if kept in a slightly damp atmosphere.

Having described my invention, what I claim as new and desire to protect by Letters Patent of the United States, is:

1. The process of preserving fruit comprising the slicing of the fruit, immediate immersion of the same into a boiling solution of water, sugar and citric acid until the fruit becomes substantially transparent, and finally drying the same.

2. The process of preserving cooked fruit comprising the peeling, coring and slicing of the fruit, immediate immersion of the same into a boiling solution of water, sugar and citric acid in the proportion of approximately one quart of water, one and three quarter pounds of sugar and one half teaspoonful taken from a gill of water in which has been previously dissolved an ounce of citric acid, for each quantity of approximately ten pounds of the fruit, and finally drying the same.

WALTER LOIS LODGE.

Witnesses:
FRED P. GORIN,
A. W. LOHMANN.

Copies of this patent may be obtained for five cents each, by addressing the "Commissioner of Patents Washington, D. C."